(12) United States Patent
Imig et al.

(10) Patent No.: US 8,972,397 B2
(45) Date of Patent: Mar. 3, 2015

(54) AUTO-DETECTION OF HISTORICAL SEARCH CONTEXT

(75) Inventors: Scott K. Imig, Redmond, WA (US); Johnson T. Apacible, Mercer Island, WA (US); Aravind Bala, Redmond, WA (US); Peter R. Bailey, Kirkland, WA (US); Gayathri Ravichandran Geetha, Bellevue, WA (US); Robert L. Rounthwaite, Fall City, WA (US); Hung-chih Yang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 105 days.

(21) Appl. No.: 12/721,565

(22) Filed: Mar. 11, 2010

(65) Prior Publication Data

US 2011/0225192 A1 Sep. 15, 2011

(51) Int. Cl.
*G06F 7/00* (2006.01)
*G06F 17/30* (2006.01)

(52) U.S. Cl.
CPC .... *G06F 17/30646* (2013.01); *G06F 17/30867* (2013.01)
USPC .......................................................... 707/732

(58) Field of Classification Search
USPC ........................................ 707/732, 723, 706
See application file for complete search history.

(56) References Cited

U.S. PATENT DOCUMENTS

| | | | |
|---|---|---|---|
| 6,687,696 B2 | 2/2004 | Hofmann et al. | |
| 6,771,569 B2 | 8/2004 | Nagata et al. | |
| 6,895,406 B2 | 5/2005 | Fables et al. | |
| 6,993,586 B2 | 1/2006 | Chen et al. | |
| 7,058,626 B1 | 6/2006 | Pan et al. | |
| 7,072,963 B2 * | 7/2006 | Anderson et al. | 709/225 |
| 7,092,936 B1 | 8/2006 | Alonso et al. | |
| 7,328,216 B2 | 2/2008 | Hofmann et al. | |
| 7,340,460 B1 | 3/2008 | Kapur et al. | |
| 7,363,282 B2 | 4/2008 | Karnawat et al. | |
| 7,533,082 B2 | 5/2009 | Abbott et al. | |
| 7,603,349 B1 | 10/2009 | Kraft et al. | |

(Continued)

OTHER PUBLICATIONS

Li, et al., "Learning Query Intent from Regularized Click Graphs", Retrieved at<< http://research.microsoft.com/en-us/um/people/xiaol/papers/sigir2008.pdf>>, Proceedings of the 31st annual international ACM SIGIR conference on Research and development in information retrieval Jul. 20-24, 2008.

(Continued)

*Primary Examiner* — Usmaan Saeed
*Assistant Examiner* — Paul Kim
(74) *Attorney, Agent, or Firm* — Heikki Einola; Judy Yee; Micky Minhas

(57) ABSTRACT

Architecture that automatically detects historical search contexts as well as behaviors related to a search query. Machine learning and hand-authored rules are employed to automatically identify search contexts. Historical information likely to be useful in the current context is surfaced. When a user enters a search query or executes another search behavior, past behaviors are exposed which are contextually related to the current behavior. The architecture also provides automatic discovery of historical contexts, features related to the contexts, and training or authoring of a system for classifying behavior into contexts, using some combination of the machine learning and/or hand-authored rules. A runtime system classifies the current user behavior into a context and surfaces contextual information to the user.

20 Claims, 9 Drawing Sheets

(56) References Cited

U.S. PATENT DOCUMENTS

| | | | |
|---|---|---|---|
| 7,617,205 B2 | 11/2009 | Bailey et al. | |
| 7,716,225 B1 | 5/2010 | Dean et al. | |
| 7,720,870 B2 | 5/2010 | Barbosa et al. | |
| 7,743,054 B2 | 6/2010 | Sasai | |
| 7,774,339 B2 | 8/2010 | White et al. | |
| 7,778,948 B2 | 8/2010 | Johnson et al. | |
| 7,792,811 B2 | 9/2010 | Nagarajayya | |
| 7,797,635 B1 * | 9/2010 | Denise | 715/738 |
| 7,809,705 B2 * | 10/2010 | Dom et al. | 707/706 |
| 7,827,170 B1 * | 11/2010 | Horling et al. | 707/722 |
| 7,860,871 B2 | 12/2010 | Ramer et al. | |
| 7,945,565 B2 * | 5/2011 | Poblete et al. | 707/722 |
| 7,949,647 B2 * | 5/2011 | Teran et al. | 707/708 |
| 7,949,659 B2 | 5/2011 | Chakrabarti et al. | |
| 8,082,511 B2 | 12/2011 | Sobotka et al. | |
| 2004/0034652 A1 | 2/2004 | Hofmann et al. | |
| 2004/0068486 A1 | 4/2004 | Chidlovskii | |
| 2004/0186775 A1 | 9/2004 | Margiloff et al. | |
| 2004/0260574 A1 | 12/2004 | Gross | |
| 2005/0160083 A1 | 7/2005 | Robinson | |
| 2005/0165753 A1 | 7/2005 | Chen | |
| 2005/0278321 A1 | 12/2005 | Vailaya | |
| 2006/0059225 A1 | 3/2006 | Stonehocker et al. | |
| 2006/0085399 A1 | 4/2006 | Carmel et al. | |
| 2006/0271618 A1 | 11/2006 | Kokubo et al. | |
| 2006/0288001 A1 | 12/2006 | Costa | |
| 2007/0038616 A1 | 2/2007 | Guha | |
| 2008/0005079 A1 | 1/2008 | Flake et al. | |
| 2008/0016046 A1 | 1/2008 | Guha | |
| 2008/0071772 A1 | 3/2008 | Rosenoff | |
| 2008/0104004 A1 | 5/2008 | Brave et al. | |
| 2008/0114743 A1 | 5/2008 | Venkataraman | |
| 2008/0134042 A1 | 6/2008 | Jankovich | |
| 2008/0189269 A1 | 8/2008 | Olsen | |
| 2008/0243838 A1 | 10/2008 | Scott | |
| 2008/0270154 A1 * | 10/2008 | Klots et al. | 705/1 |
| 2008/0306937 A1 | 12/2008 | Whilte et al. | |
| 2009/0112781 A1 | 4/2009 | Heath et al. | |
| 2009/0132484 A1 | 5/2009 | Massie | |
| 2009/0248661 A1 | 10/2009 | Bilenko et al. | |
| 2009/0327224 A1 | 12/2009 | White et al. | |
| 2010/0049498 A1 | 2/2010 | Cao et al. | |
| 2010/0057675 A1 | 3/2010 | White et al. | |

OTHER PUBLICATIONS

Yi, et al., "Query Clustering Using Click-Through Graph", Proceedings of the 18th international conference on World wide web, Retrieved at <<http://www2009.eprints.org/108/1/p1055.pdf>>, Apr. 22, 2009.

Hu, et al., "Understanding User's Query Intent with Wikipedia", Retrieved at <<http://www2009.eprints.org/48/1/p471.pdf>>, Proceedings of the 18th international conference on World wide web, Apr. 20-24, 2009.

Antonellis, Ioannis, "Mining Web Activity Logs", Retrieved at << http://www.stanford.edu/~antonell/papers/antonellis_thesis_proposal.pdf>>, Feb. 7, 2009.

Heath et al., "Defection Detection: Predicting Search Engine Switching", Poster Paper from the 17th International Conference on World Wide Web, WWW 2008, Apr. 25, 2008.

Liu et al., "A Statistical Method for Estimating the Usefulness of Text Databases", IEEE Transactions on Knowledge and Data Engineering, vol. 14, No. 6, Dec. 2002, pp. 1422-1437.

Altsearchengines.com, "Federated Search, An Alternative Definition", Retrieved From: <<http://www.altsearchengines.com/2007/07/29/federated-search-an-alternative-definition/>> Retrieved Feb. 27, 2009, Published Jul. 29, 2007.

Arguello et al., "Sources of Evidence for Vertical Selection", Proceedings of the 32nd Annual Int'l ACM SIGIR Conf. on Research and Development in Info. SIGIR 2009, Jul. 19-23, 2009, pp. 315-322, Boston, MA, USA.

Baeza-Yates et al., "Modern Information Retrieval", Jan. 1999, pp. 1-38, ACM Press I Addison-Wesley.

Beitzel, "Automatic Classification of Web Queries Using Very Large Unlabeled Query Logs", ACM Transactions on Information Systems, Apr. 2007, vol. 25, No. 2.

Bhavnani, S. K., "Domain-Specific Search Strategies for the Effective Retrieval of Healthcare and Shopping Information", Extended Abstracts of the 2002 Conference on Human Factors in Computing Systems, CHI 2002, Apr. 20-25, 2002, pp. 610-611, Minneapolis, Minnesota.

Brenes et al., "Survey and Evaluation of Query Intent Detection Methods", Proceedings of the 2009 Workshop on Web Search Click Data, Feb. 9, 2009, pp. 1-7, Barcelona, Spain.

Chang et al., "Towards Intent-Driven Bidterm Suggestion", Proceedings of the 18th International Conference on World Wide Web, WWW 2009, Apr. 22, 2009, pp. 1093-1094, Madrid, Spain.

Chau et al., "Analysis of the Query Logs of a Web Site Search Engine", Journal of the American Society for Info. Science and Technology, JASIST 2005, Aug. 2005, vol. 56, No. 13, pp. 1363-1376.

Diaz, F., "Integration of News Content into Web Results", Proceedings of the Second ACM International Conference on Web Search and Data Mining, Feb. 9-12, 2009, pp. 182-191, Barcelona, Spain.

Diaz et al., "Adaptation of Offline Vertical Selection Predictions in the Presence of User Feedback", Proceedings of the 32nd Annual International ACM SIGIR Conference on Research and Development in Information Retrieval, SIGIR 2009, Jul. 19-23, 2009, pp. 323-330, Boston, MA, USA.

Diemert et al., "Unsupervised Query Categorization Using Automatically-Built Concept Graphs", Proceedings of the 18th International Conference on World Wide Web, WWW 2009, Apr. 20-24, 2009, pp. 461-470, Madrid, Spain.

Jansen et al., "Real Life, Real Users, and Real Needs: A Study and Analysis of User Queries on the Web", Information Processing and Management, Mar. 2000, vol. 36 No. 2, pp. 207-227.

Mackay et al., "A Hierarchical Dirichlet Language Model", Natural Language Engineering, 1994, vol. 1, pp. 1-9.

Madhavan et al., "Google's Deep Web Crawl", PVLDB, Aug. 24-30, 2008, pp. 1241-1252, vol. 1, No. 2, Auckland, New Zealand.

Netscape Communication Corporation, "Open Directory Project" Retrieved at: <<http://www.dmoz.org>>.

Nguyen, "Searchable Web Sites Discovery and Recommendation", Proceedings of the 18th International World Wide Web Conference, Apr. 20-24, 2009.

Salton et al., "Term-Weighting Approaches in Automatic Text Retrieval", Information Processing and Management, Jan. 1988, pp. 513-523, vol. 24, No. 5.

Shen et al., "Building Bridges for Web Query Classification", Proceedings of the 29th Annual International ACM SIGIR Conference on Research and Development in Information Retrieval, SIGIR 2006, pp. 131-138, Aug. 6-11, 2006, Seattle, Washington, USA.

Spall, J. C., "Implementation of the Simultaneous Perturbation Algorithm for Stochastic Optimization", IEEE Transactions on Aerospace and Electronic Systems, Jul. 1998, vol. 34, No. 3, pp. 817-823.

Zhai et al., "A Study of Smoothing Methods for Language Models Applied to Ad Hoc Information Retrieval", ACM Transactions on Information Systems, Apr. 2004, pp. 179-214, vol. 22, No. 2.

Spall, J. C., "Multivariate Stochastic Approximation Using a Simultaneous Perturbation Gradient Approximation", IEEE Transactions on Automatic Control, Mar. 1992, pp. 332-341, vol. 27, No. 3.

Non-Final Office Action for U.S. Appl. No. 12/715,360, Mailed Date: Feb. 14, 2012.

Response to Non-Final Office Action for U.S. Appl. No. 12/715360, filed Jul. 3, 2012.

Final Office Action for U.S. Appl. No. 12/715,360, Mailed Date: Oct. 2, 2012.

Response to Final Office Action for U.S. Appl. No. 12/715,360, filed Jan. 28, 2013.

Applicant Initiated Interview Summary for U.S. Appl. No. 12/715,360, filed Jan. 28, 2013.

Notice of Allowance for U.S. Appl. No. 12/715,360, Mailed Date: Jul. 22, 2013.

Notice of Allowance for U.S. Appl. No. 12/715,360, Mailed Date: Nov. 1, 2013.

(56) References Cited

OTHER PUBLICATIONS

RCE and Amendment for U.S. Appl. No. 12/715,360, filed Oct. 7, 2013.
Non-Final Office Action for U.S. Appl. No. 12/432,699, Mailed Date: Mar. 25, 2011.
Response to Non-Final Office Action for U.S. Appl. No. 12/432,699, filed Jun. 30, 2011.
Examiner Interview Summary for for U.S. Appl. No. 12/432,699, Mailed Date: Aug. 15, 2011.
Final Office Action for U.S. Appl. No. 12/432,699, Mailed Date: Sep. 7, 2011.
Response to Final Office Action for U.S. Appl. No. 12/432,699, filed Dec. 7, 2011.
Non-Final Office Action for U.S. Appl. No. 12/432,699, Mailed Date: Jul. 29, 2013.
Response to Non Final Office Action for U.S. Appl. No. 12/432,699, filed Oct. 29, 2013.
Notice of Non-Compliant Amendment for U.S. Appl. No. 12/432,699, Mailed Date: Dec. 31, 2013.
Amendment for U.S. Appl. No. 12/432,699, filed: Jan. 17, 2014.
Final Office Action for U.S. Appl. No. 12/432,699, Mailed Date: Mar. 26, 2014.
Response to Final Office Action for U.S. Appl. No. 12/432,699, filed Jul. 11, 2014.

* cited by examiner

AUTO-DETECTION OF HISTORICAL SEARCH CONTEXT

BACKGROUND

A vast amount of data is being stored and made accessible on networks such as enterprises and the Internet. The ability to search these large databases poses new challenges to developers to return search results in a reasonable time and with optimum quality. Slow searches may be acceptable if carried out infrequently by users in a single session, but when users routinely perform searches for data, whether personal or business related, the associated costs in user frustration and business resources are unacceptable.

Many search engines allow users to store records of search history, including queries issued, pages selected from the search engine results page, and other actions. A typical user search behavior exhibits a variety of overlapping search contexts. For example, different search behaviors of the same user may relate to shopping, travel, or finance, and at different times. A single user search history oftentimes includes behaviors from many such contexts which are not easily differentiated by time or casual inspection. Moreover, the number of contexts and lack of differentiation increases with the length of the history and density of search behavior, thereby exacerbating analysis of such information.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture automatically detects historical search contexts as well as user behaviors which indicate entering or leaving these contexts. Historical information deemed to be useful in the current context is also surfaced. In particular, historical queries, website visits, and other actions from the user history which are potentially interesting or useful in the current search context can be surfaced. Moreover, when a user enters a search query or executes another search behavior, past behaviors are exposed which are contextually related to the current behavior.

The architecture also provides automatic discovery of historical contexts, features related to contexts, and training or authoring of a system for classifying behavior into contexts, using some combination of the machine learning and/or hand-authored rules. A runtime system classifies the current user behavior into a context and surfaces contextual information to the user. Machine learning and hand-authored rules are employed to automatically identify search contexts.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
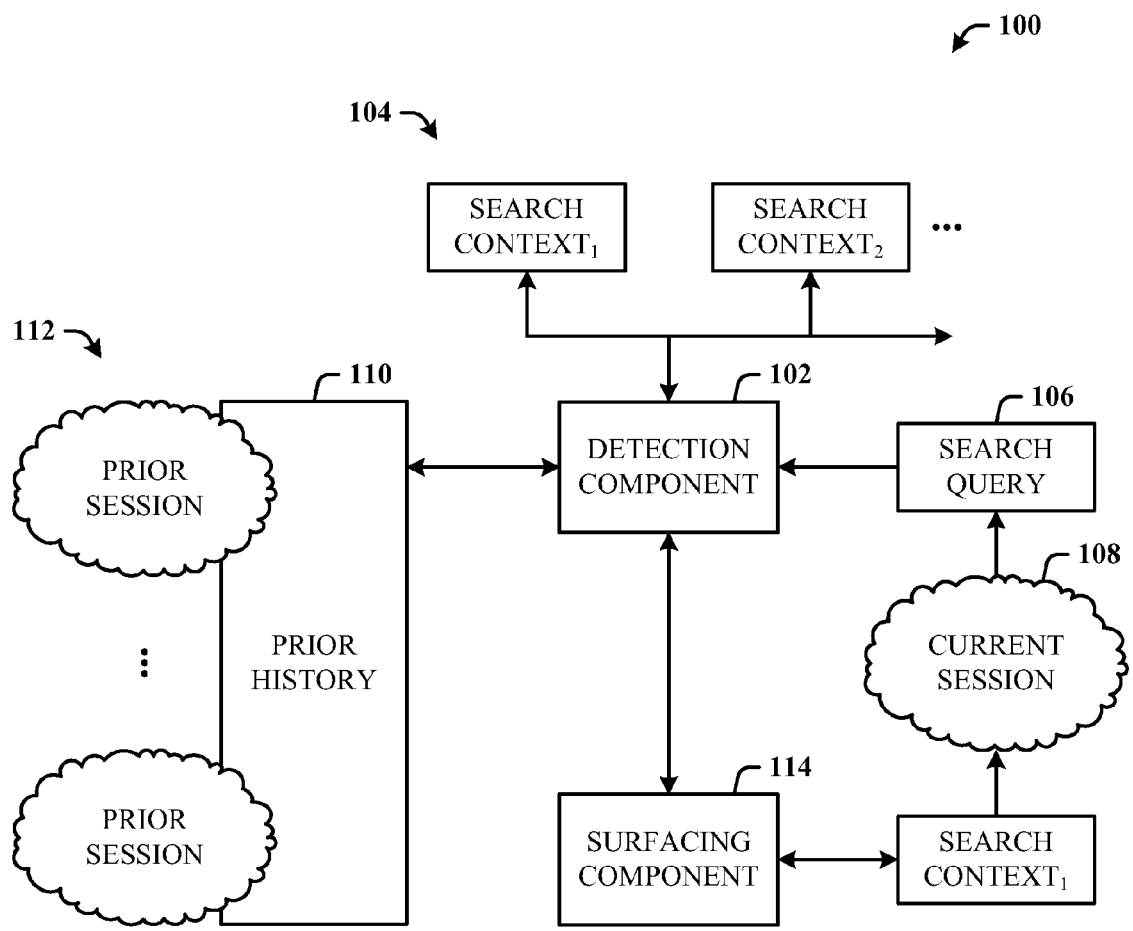
FIG. 1 illustrates a computer-implemented search system in accordance with the disclosed architecture.

The disclosed architecture provides for the automatic detection of historical search contexts to enhance the user search activity. Historical information deemed to be useful in the current context includes current and past user behavior. Behaviors of interest include queries (past and current), clicks, dwell time, browsing trails, and sessions of multiple queries and clicks, for example. The term behavior as described herein refers to any user interaction related to the search session or multiple such interactions identifiable as a pattern of behavior (e.g., in a sequence).

A historical context is a group of behaviors from user history, related in a way that is helpful or meaningful to the user. Note that a search context is not necessarily tied to a described semantic meaning (e.g., "shopping" or "travel"), as behaviors may be related more abstractly. A search context can be associated with time periodicity, such as time of day or time of year. Behaviors in a context can be related because of appearance in a commonly followed sequence, for example. Behaviors may be related by websites already visited or websites open in other tabs, by other applications in use, by the physical location of the user, etc.

Similarity measures can be employed that analyze queries and clicks. Similarity analysis can be applied to current and past queries. Alternatively, or in combination therewith, similarity analysis can be applied to past and current click activity.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented search system 100 in accordance with the disclosed architecture. The system 100 can include a detection component 102 that detects one or more of search context 104 in response to a search query 106 of a current session 108. The search context 104 is obtained from the search history 110 accumulated from one or more previous search sessions 112. The system 100 can further include a surfacing component 114 that exposes one or more of the search context 104 as part of the current session 108. The detection component 102 can be fine tuned by employing feedback related to the search context and selection. Signals such as click-through and/or dwell time can be used as measurements and learning to fine tune the algorithms used in the detection component 102. This is illustrated as well in FIG. 3.

The detection component 102 can further detect user behavior related to entering or leaving the context. The detection component 102 can employ machine learning to automatically detect the search context, and/or employ authored rules to automatically detect the search context. The detection component 102 and surfacing component 114 operate at runtime to detect and surface the context 104 based on the current user associated with the current session 108. The detection component 102 can cluster queries and resource locators (e.g., URLs—uniform resource locators) by similarity based on a click graph. In this implementation, the clusters are used as synthetic tags which are features used by the classifier. The detection component 102 can detect the search context based on geolocation (geographic location) and network location (e.g., IP address) from which the search query was made. The detection component 102 can further include a cross-machine capability that identifies the user regardless of the machine/device that the user may be using to perform the search.

Figure 2:
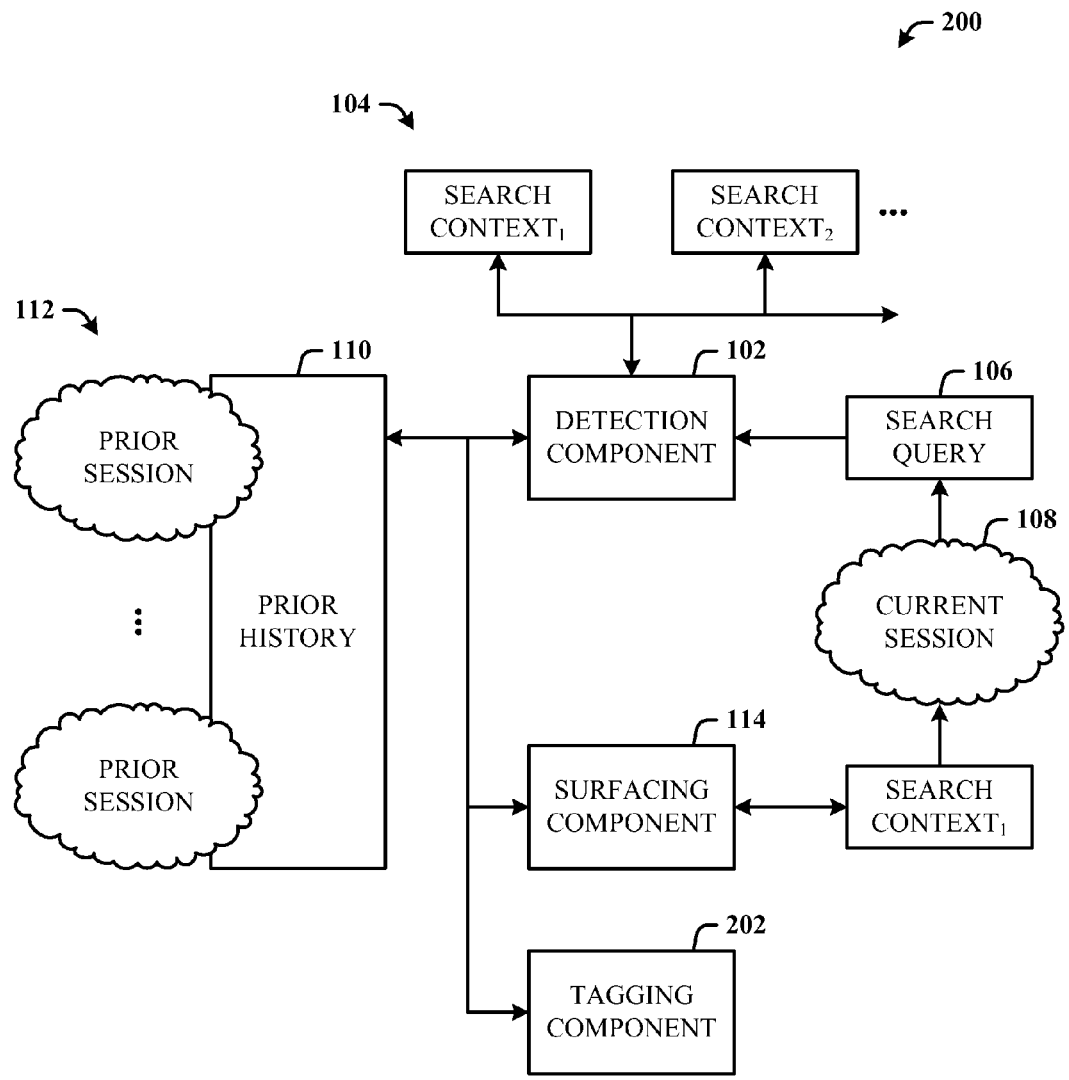
FIG. 2 illustrates an alternative embodiment of a search system that further includes a tagging component.

FIG. 2 illustrates an alternative embodiment of a search system 200 that further includes a tagging component 202. The system 200 includes the entities and components of the system 100 of FIG. 1, and additionally, the tagging component 202 tags queries and network resource locators of network-based content sources using a random walk (an algorithmic technique that captures or associates relationships in a bipartite query-click graph) over click graphs. Alternative forms of capturing these relationships can be employed. Additional tagging techniques are described herein include but are not limited to, instant answers which fire for queries (which are in turn based on static lists, dynamic grammars, and learned relevance), authored lists of queries by category, runtime classification of "navigational" queries which are intended to reach a specific website, runtime classification of adult, or potentially offensive, queries, a random walk over click graphs that treats URLs as terminal states, the domain of the most frequently clicked URL, clusters of queries based on click behavior, search verticals (such as health or image search engines) where the relative frequency of the queries is higher than the web search vertical, and the most common query to be entered within a specified amount of time of the current query during a session.

The tags can also include time, location, and device, or combinations of any of the tags, such as time/location/device. Time includes not only seasonal information (e.g., the week leading up to Valentine's Day), but also whether the query was made in the morning, afternoon, or evening. The device can assist in location (e.g., office) or activity (e.g., traveling). Another location signal can be obtained from the reverse IP information that can be used to determine proximity to city/state/country.

Put another way, a computer-implemented search system is provided comprising a detection component that detects search context in response to a search query of a current session. The search context obtained from search history can be accumulated from one or more previous search sessions and user behavior related to entering and leaving the context.

A surfacing component surfaces the search context, presents the search context, and allows re-entry into the search context as part of the current session.

The detection component employs machine learning and rules to automatically detect the search context. Machine learning as defined herein is not limited to probabilistic algorithms, but also includes similarity measures such as cosine distance, for example, artificial intelligence for pattern recognition, etc. A tagging component that tags queries and network resource locators by network resources based on a click graph, and queries by domains that comprise a portion of query clicks. The surfacing component automatically surfaces and presents in a search interface historical information related to the search context. The detection component detects the search context based on at least one of aggregate user data, individual user data, geographic location data, network location data, temporal information, application interaction, current user behavior, or past user behavior.

In other words, the automatic discovery of search contexts from user behavior, including queries, clicks, and other data collected within or across sessions, either aggregate or per user, is provided. Matching of a current user behavior to a historical context can occur at runtime. Tagging queries and URLs based on categories of webpages from network sources is performed using a random walk over the click graph, and then propagating the information from categorized pages to initial states in the random walk.

Figure 3:
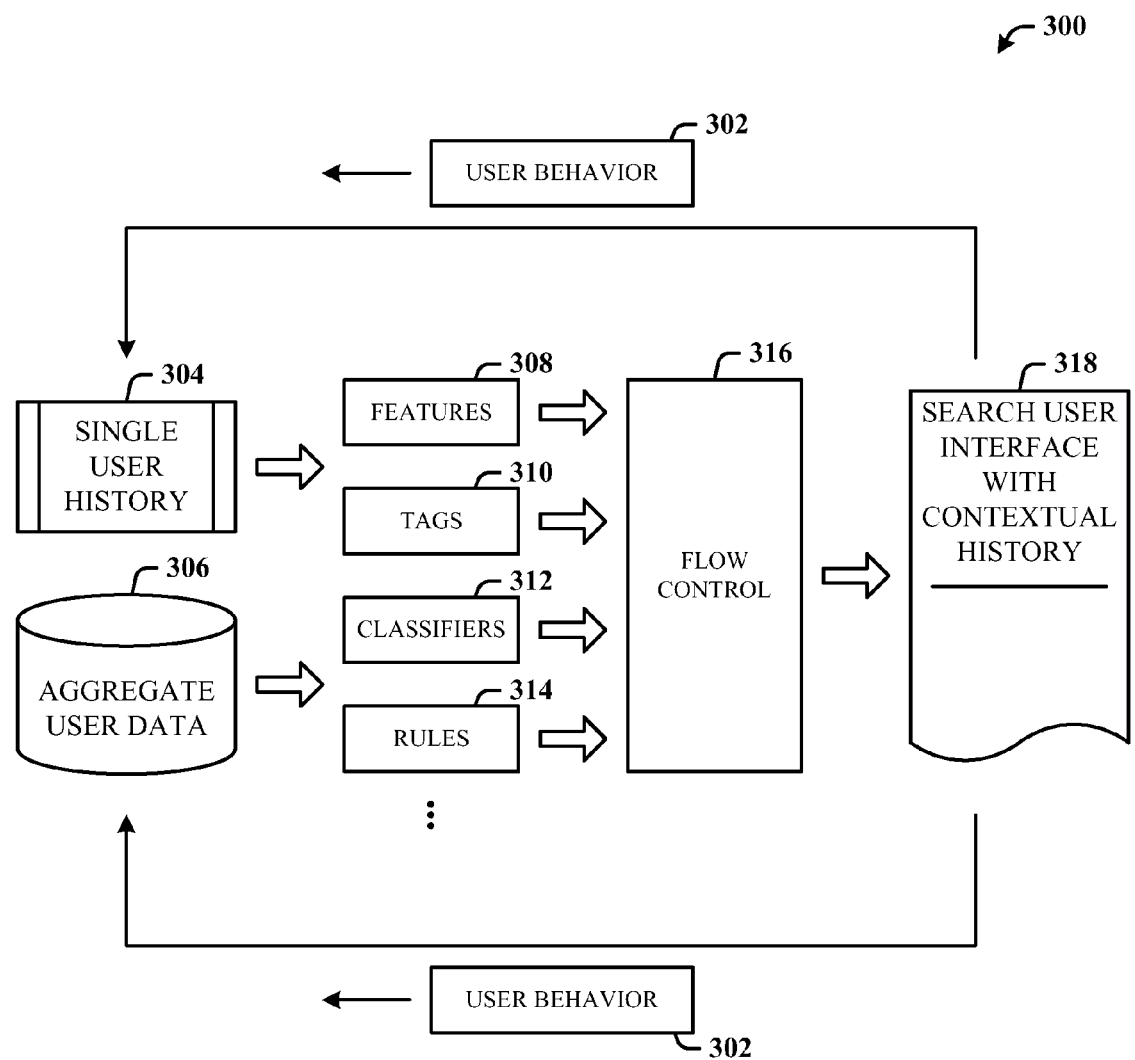
FIG. 3 illustrates a flow diagram that employs continual accumulation of user behavior data based on current session activity.

FIG. 3 illustrates a flow diagram 300 that employs continual accumulation of user behavior data 302 based on current session activity. The diagram 300 shows single user history 304 and aggregate user data 306 that serves as the basis for input. The input can include features 308, tags 310, classifier input 312, rules 314, and so on. The input is passed to a flow control logic 316 that can include the detection component 102 and surfacing component 114 described herein. Contextual history is then compiled and presented in a search user interface 118. Then, based on current user behavior 302 detected and captured from the current session via the user interface 318, the user behavior is stored in the single user history 304 and/or in the aggregated user data 306. Classifiers can include Bayesian classifiers.

Machine learning and authored rules (e.g., human-authored) are used to automatically identify search contexts. The historical information surfaced is that information which is likely (e.g., according to a probabilistic and/or statistical computation) to be useful in the current context. In particular, when a user enters a search query or executes another search behavior, the past behaviors which are contextually related to the current behavior are detected and surfaced. This includes the automatic discovery of historical contexts, features related to contexts, and training or authoring a system for classifying behavior into contexts, optionally, using a combination of machine learning and/or hand-authored rules. The runtime system operates to classify the current user behavior into a context and surfaces contextual information to the user.

With respect to iterative training, upon presentation of contextual history in the user interface, the user behavior can be consumed as new training data for the classifiers involved in the algorithm. This provides a feedback mechanism for tuning the detection component 102 of FIG. 1 by continually updating the user history 304 and aggregate user data 306. For example, click or hover behavior and other interaction with the user interface can be evidence of the degree of relatedness between the current context and contextual information in the interface. A classifier can be retrained using this data, either in an online or offline manner.

In accordance with the disclosed architecture, a user is allowed to easily re-enter a historical search context. This is useful for re-finding information previously discovered, checking for updates and status (e.g., as in sports scores, stock prices, etc.), and continuing a task previously initiated and then interrupted, for example. As indicated, aggregate and individual user data can be utilized to identify historical contexts, as well as hand-authored rules, as well as other logic.

With respect to the discovery of historical context and classification, the algorithm can employ one or more classifiers, or scoring functions, which accept as input a pair of behaviors and output a relatedness score between those behaviors. Of particular interest is relatedness between the current user behavior and historical behaviors. A historical context can then be thought of as a set of behaviors the relatedness score of which is greater than a threshold. Search contexts initially identified by scoring mechanisms can be filtered, combined, or otherwise altered by rules and other logic.

Note that a relatedness score is not necessarily symmetric. Where the relatedness score is asymmetric, a search context can be defined as those behaviors related to a distinguished behavior. Of these behaviors, the most interesting search context consists of those queries related to the most recent or current behavior.

Consider the following example method. For a particular user, let B represent the user behaviors in search history. For each pair in the Cartesian product B×B, the pair is represented as a vector in an n-dimensional feature space. That is, a pair p∈B×B is represented as a tuple $$<f_1, f_2, \ldots, f_n> \in F_1 \times F_2 \times \ldots \times F_n,$$

where each Fi is a set of values permissible for that feature.

This defines a mapping $$B \times B \xrightarrow{p} F_1 \times F_2 \times \ldots \times F_n.$$

The relatedness score can then be computed by a composition of functions $$B \times B \xrightarrow{p} F_1 \times F_2 \times \ldots \times F_n \xrightarrow{s} R,$$

where R represents the real numbers. In practice, the co-domain of s is oftentimes the interval [0,1]. This is just one example of a mapping, in that an alternative mapping can be the following with some signal S used as input to the function p, $$S \times B \times B \xrightarrow{p} F_1 \times F_2 \times \ldots \times F_n$$

The disclosed architectures can be generalized or modified in other ways.

The function s is obtained by training a classifier against a set of training data, which can be obtained explicitly by human judgment or implicitly by using aggregate user behavior. The training data contains information about user behaviors and relatedness. In a simple case, the training data can comprise pairs of queries or clicks, and a binary zero or one indicating a human judgment of whether the pair is related. A more general option is to use any data from user interactions with the browser and the search engine. The latter allows iterative improvement of the classifier after the feature is released to the search engine's web user interface, by collecting training data from user interactions with contextual history features in the user interface.

As an example, the function s can be implemented as a logistic function $$s(f_1, \ldots, f_n) = \frac{1}{1 + e^{-a_0 - a_1 f_1 - \ldots - a_n f_n}}$$

where the weights $a_i \in R$ are obtained by running logistic regression against the training data. However, this is not to be construed as limiting, since other functions can be employed.

In addition to discovery of query contexts by relatedness scores and machine learning, other approaches can be employed such as hand-authored or automatically discovered rules that group user behaviors into contexts. For example, the algorithm can run a logistic classifier to discover behaviors related by feature vectors, and then apply a hand-authored rule to add any remaining behaviors related by word overlap (the number of words common between the current query and a historical query).

Following are features that can be employed to describe user behavior for the mappings p and s. Tags can be used as features. A user behavior can often be assigned one or more tags (or labels) such as "shopping", "cars", "music", "news", etc. Tags can be used as binary features $f_i \in F_i = \{0, 1\}$ in the mapping p. Consider a set T of all allowable tags for any behavior. Each tag $t \in T$ gives rise to a binary feature on behavior pairs, taking value zero if the tag applies to both queries in a pair. Alternatively, or in addition, each pair $<t1, t2> \in T \times T$ can be used as a binary feature, taking a value one on a pair $<b1, b2>$, if t1 applies to b1 and t2 applies to b2, and zero otherwise. The binary feature associated with a tag can be directly or inversely correlated with relatedness. In addition, the number of tags overlapping can be highly predictive of relatedness. Since tags can arise from different sources, the overlapping number of tags can be calculated per type of tag, or in aggregate. Note that the foregoing is an example of one implementation, and is not to be construed as limiting.

There are several ways to discover tags for user behaviors, some of which are briefly enumerated here. Note that it is not a requirement that tags be meaningful to humans. If desired, a tag can be an abstract binary feature without semantic meaning.

Tags can be obtained by human authoring. For example, human authors can compile lists of movies, products, locations, etc., and each query occurring in a list can be assigned a tag associated with the list. Such lists can also be compiled by automatic methods using, for example, an Internet spider and machine learning, or compiled semi-automatically, for example, by using a human computation paradigm.

The user can self-tag historical behaviors, for example, by typing or choosing labels for websites visited or queries issued. In another approach, specialized ("vertical") search engines can be employed to tag the most frequent queries. For example, queries frequently issued to a movie search engine are likely to be related, as are queries frequently issued to a shopping search engine.

Tags can be obtained from a bipartite query-click graph, where the disjoint sets in the click graph are queries and URL (uniform resource locator) clicks, and the weight of an edge between a query q and a link l is the frequency of clicks on link 1 after issuing query q. Frequency weights can be aggregate or per user, for example, as well as relative or absolute.

One way to leverage a query click-graph to obtain tags is to use a random walk over the click-graph, using pages listed in an open content directory such as ODP (Open Directory Project) and web-based collaborative efforts (e.g., Wikipedia) as terminal states in the random walk. Such pages are labeled by users with categories. The categories in the terminal states can serve as tags for the initial queries (or clicks) in the random walk.

In yet another approach, click frequency data for queries gives rise to useful tags. If, for a given query, the majority of clicks in aggregate user data are on a particular URL, the URL can serve as a tag for the query. Similarly, if the majority of clicks are on URLs in a particular domain, the domain can serve as a tag. If the majority of clicks are on URLs in a particular content category, the category can serve as a tag.

Clicks on URLs following queries can also be used to cluster the queries, using, for example, the vector of URL click frequency as a feature vector and an agglomerative clustering algorithm. A query cluster can be used as a tag for the queries in the cluster. If a readable label is needed, the highest frequency query in the cluster can be used as a label. Note that this tagging approach works for URL clicks as well as queries, using frequencies of queries, for example, that led to a click as a feature vector.

With respect to temporal features, given a pair of behaviors <b1, b2>, a number of useful features arise from temporal considerations. One useful feature is the latency between the historical behavior b2 and historical instances of the behavior b1. The historical instances do not include b1 itself, but rather historical behaviors equivalent to it, equivalent queries, or equivalent URL clicks. Other temporal features can also be useful such as dwell time associated with one or both behaviors, the time of day, time elapsed between b2 and b1 itself, and so on.

Word overlap can be beneficial. When the behaviors b1 and b2 are queries, the number of non-noise words that overlap between b1 and b2 is a useful feature. Additionally, edit distance can be a considered feature. The distance (e.g., Levenshtein), or edit distance, can be useful to distinguish near-duplicates and spelling mistakes.

With respect to runtime identification of context, when a user visits the search engine and performs a search behavior, the system can use a combination of the classifier described above, hand-authored rules, and/or additional control flow to surface historical information which is related to the current context. For example, the user interface can present historical queries and URLs clicked for those queries, along with time and frequency information for each. This is illustrated in the example user interface 500 of FIG. 5.

Figure 4:
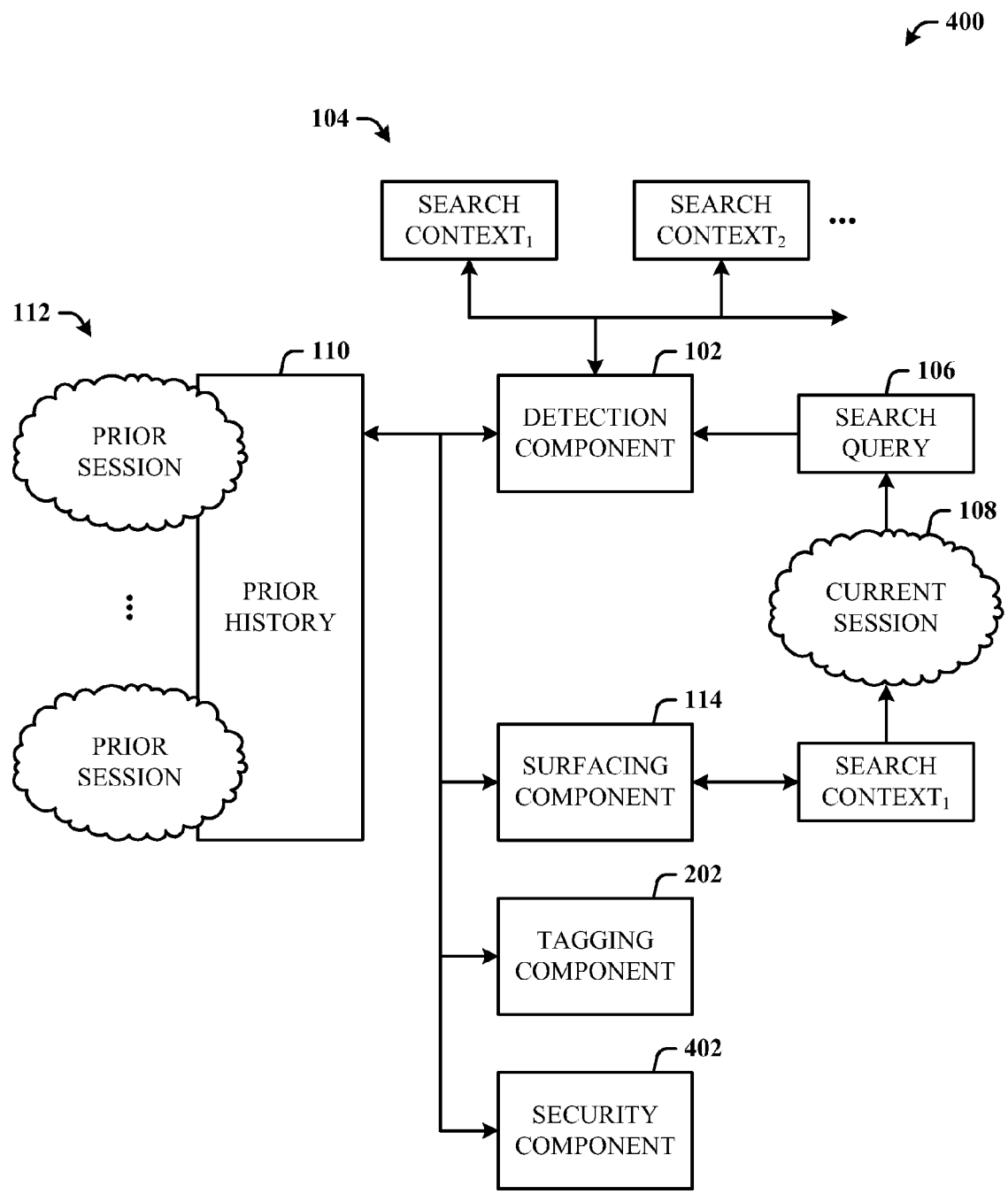
FIG. 4 illustrates a search system that further employs a security component for authorized and secure handling of user information.

FIG. 4 illustrates a search system 400 that further employs a security component 402 for authorized and secure handling of user information. The security component 402 allows the subscriber to opt-in and opt-out of tracking information as well as personal information that may have been obtained at signup and utilized thereafter. The subscriber can be provided with notice of the collection of personal information, for example, and the opportunity to provide or deny consent to do so. Consent can take several forms. Opt-in consent imposes on the subscriber to take an affirmative action before the data is collected. Alternatively, opt-out consent imposes on the subscriber to take an affirmative action to prevent the collection of data before that data is collected. This is similar to implied consent in that by doing nothing, the subscriber allows the data collection after having been adequately informed.

Where other applications of the security component 402 are employed, consider the following example, where a dialog box is presented as to notice and consent for a "phishing filter" application that collects website information from the user and compares this information against a database of suspected phishing websites. Any hits in the database are then sent back to the phishing filter. The dialog box provides notice that personal data will be collected as part of the phishing filter, gives a value proposition for using the phishing filter ("make your browser more secure"), asks for consent via the radio buttons to opt-in to the data collection, includes an explanation on what the data will be used for, and also includes a prominent link to a vendor privacy policy statement.

The security component 402 also allows the subscriber to access and update profile information. For example, the subscriber can view the personal and/or tracking data that has been collected, and provide corrections. Where sensitive personal information such as health and financial information can be tracked and obtained during subscription or thereafter, the security component 402 ensures that the data is housed using security measures appropriate for the sensitivity of the data. Moreover, vendor access to such information can be restricted using the security component 402 for access only to authorized viewers.

The security component 402 ensures the proper collection, storage, and access to the subscriber information while allowing for the dynamic selection and presentation of the content, features, and/or services that assist the inactive subscriber to obtain the benefits of a richer user experience and to access to more relevant information.

Figure 5:
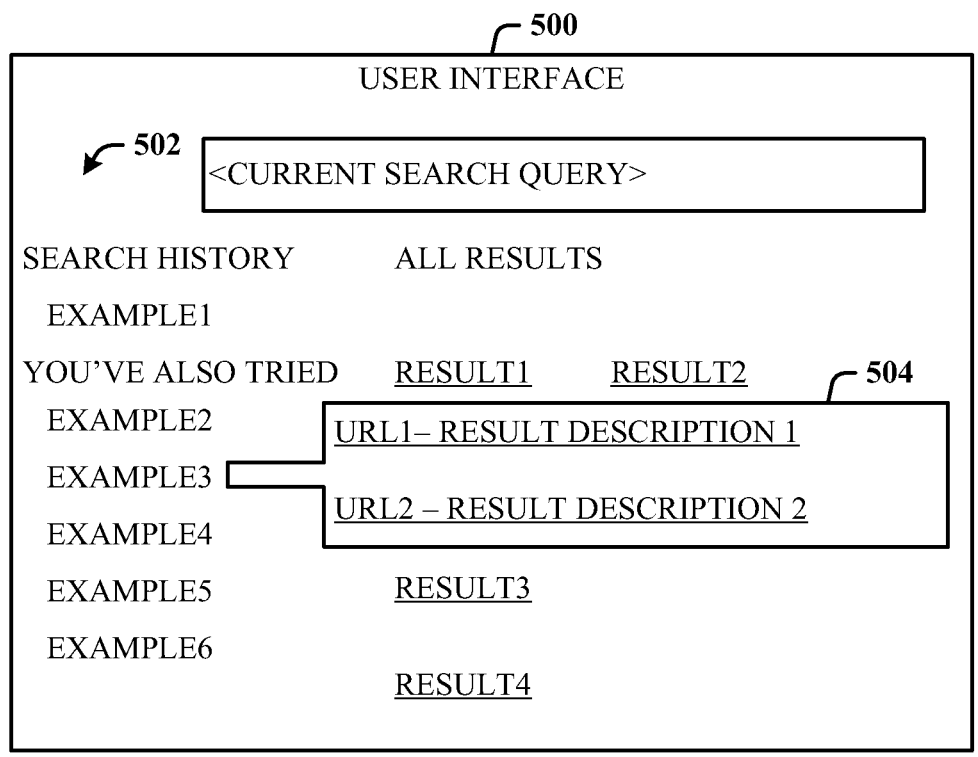
FIG. 5 illustrates is an exemplary illustration of a search user interface for presenting contextual history.

FIG. 5 illustrates is an exemplary illustration of a search user interface 500 for presenting contextual history. However, other constructions are possible for making contextual history available to the user in any form. Historical information from the current context can be presented to let a user easily re-enter the historical context of a current behavior. The user interface 500 can present both recent history and relevant queries. One of many possible user interface constructions shows historical queries 502 related to the current query (e.g., on the left hand rail) of the search results page. When the user hovers over a historical query (Example3), a fly-out menu 504 appears that presents the URLs historically clicked for that query.

For example, consider that the current search query is "mozart". The Example1 value under Search History can be "entourage", while the example values under "you've also tried" can include "haydn", "vivaldi", "beethoven", and "bach". Other returned results (e.g., Result1, Result2, etc.) can include links to videos, Mozart CDs sites, Mozart reference sites, wiki sites, classical music sites, etc. Thus, based on a related context of a previous search, the user can re-enter the previous context, if desired.

The user interface 500 can also include the functionality to provide emphasis (e.g., highlight) words in historical queries that are not in the current query. Alternatively, this emphasis can be part of the relevance computation engine.

Rules and other logic can be used to augment the automatically discovered contextual information from history. For example, it may be desirable to filter out queries that are deemed to be offensive from the historical context. It may also be desirable to combine or arbitrate multiple candidates for historical contexts, or supplement the automatically discovered contexts with additional useful information.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
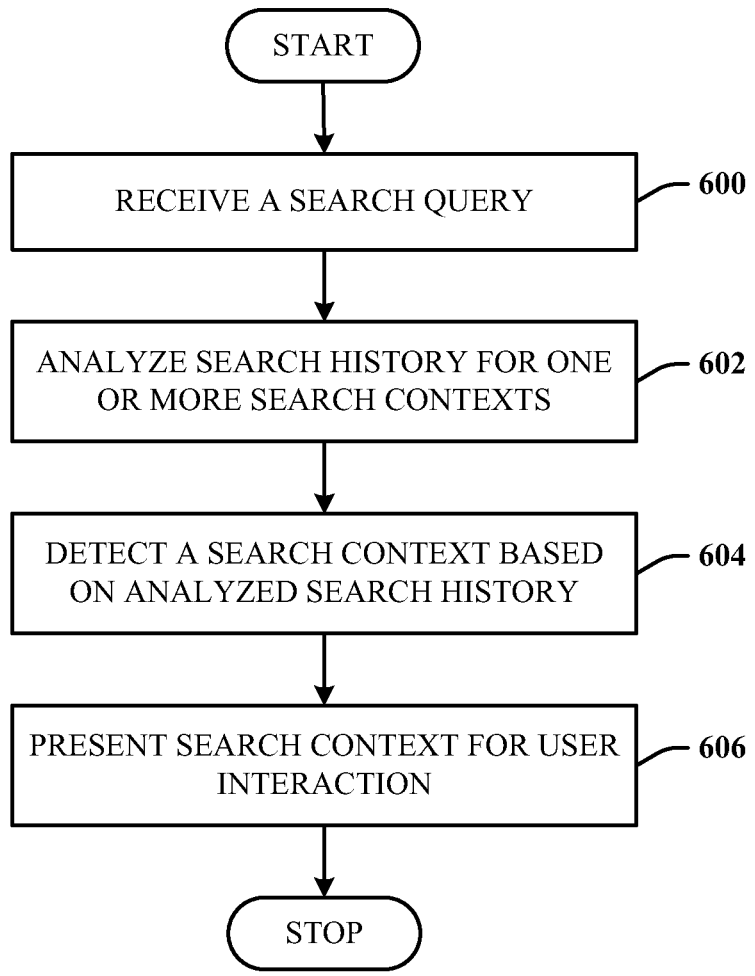
FIG. 6 illustrates a computer-implemented search method in accordance with the disclosed architecture.

FIG. 6 illustrates a computer-implemented search method in accordance with the disclosed architecture. At 600, a search query is received. At 602, search history is analyzed for one or more search contexts. At 604, a search context is detected based on the analyzed history. At 606, the search context is presented for user interaction.

Figure 7:
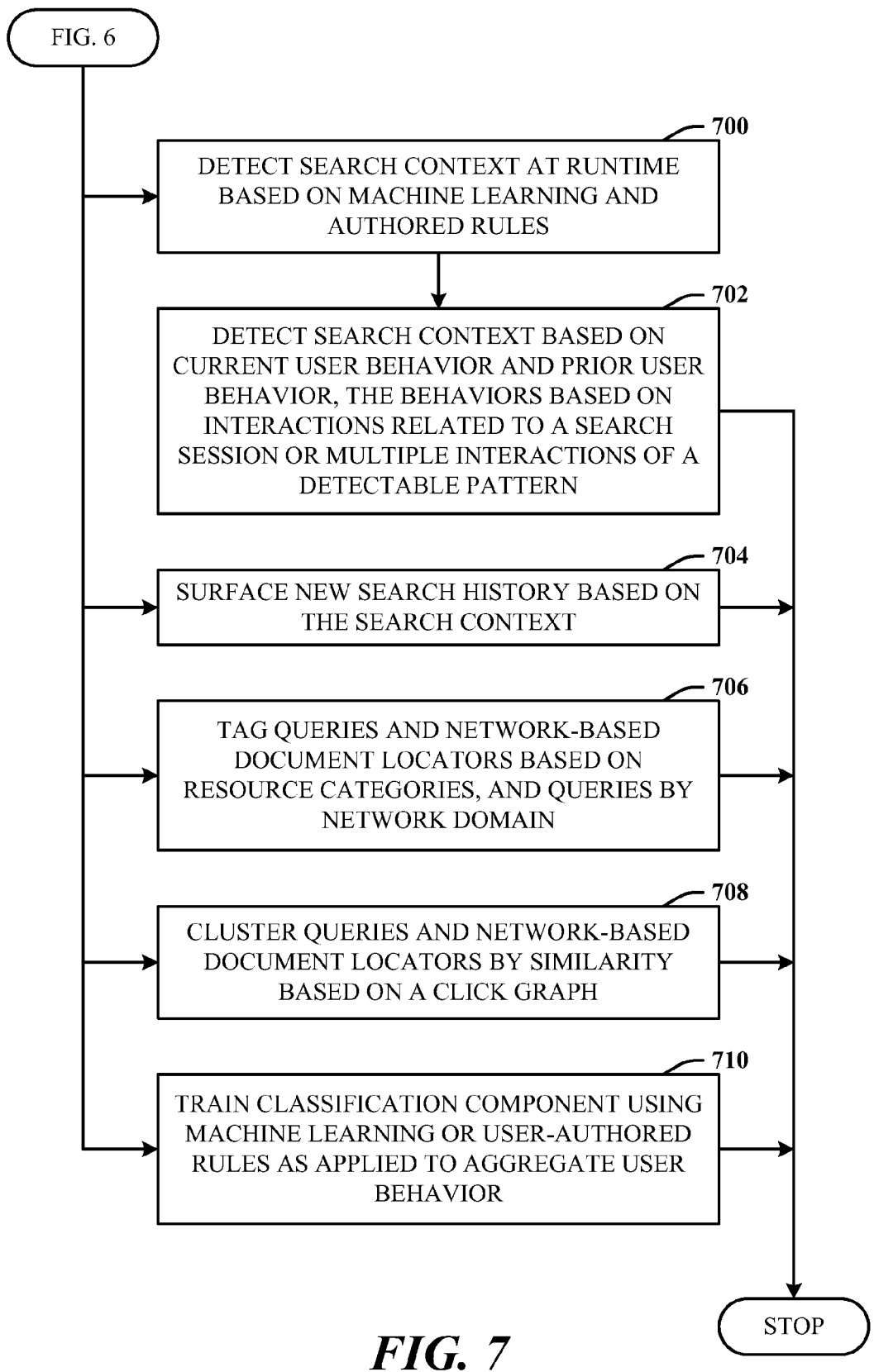
FIG. 7 illustrates further aspects of the method of FIG. 6.

FIG. 7 illustrates further aspects of the method of FIG. 6. At 700, the search context is detected at runtime based on machine learning and authored rules. At 702, the search context is detected based on current user behavior and prior user behavior, the behaviors based on interactions related to a search session or multiple interactions of a detectable pattern. At 704, new search history is surfaced based on the search context. At 706, queries and network-based document locators are tagged based on resource categories, and queries by network domain. At 708, queries and network-based document locators are clustered by similarity based on a click graph. At 710, a classification component is trained using machine learning or user-authored rules as applied to aggregate user behavior.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
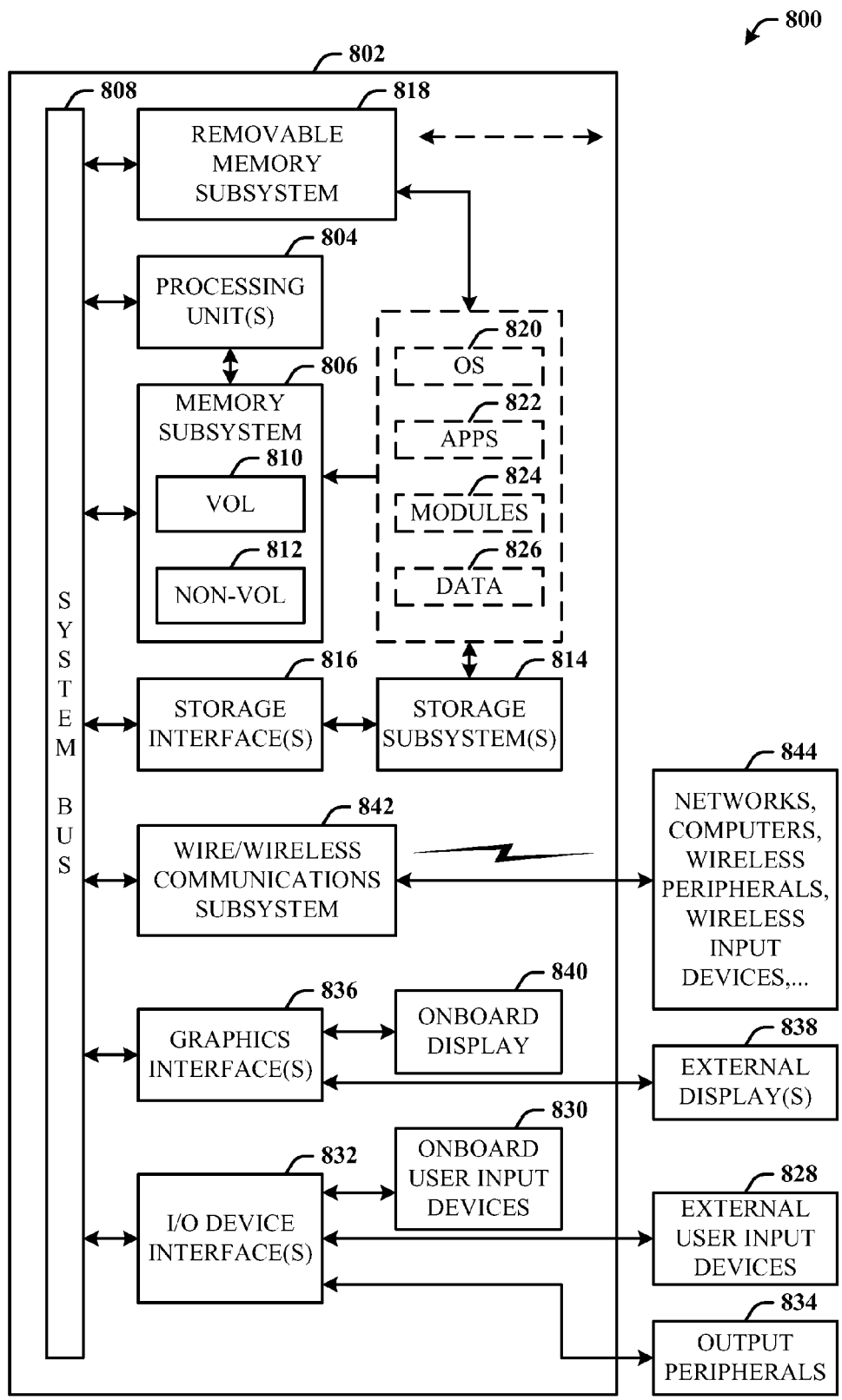
FIG. 8 illustrates a block diagram of a computing system that executes historical search context processing in accordance with the disclosed architecture.

Referring now to FIG. 8, there is illustrated a block diagram of a computing system 800 that executes historical search context processing in accordance with the disclosed architecture. In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include computer-readable storage (physical storage media) such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 (physical storage media) can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The one or more application programs 822, other program modules 824, and program data 826 can include the entities and components of the system 100 of FIG. 1, the entities and components of the system 200 of FIG. 2, the entities and flow of the diagram 300 of FIG. 3, the entities and components of the search system 400 of FIG. 4, the user interface 500 of FIG. 5, and the methods represented by the flowcharts of FIGS. 6 and 7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Computer readable media can be any available media that can be accessed by the computer 802 and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 9:
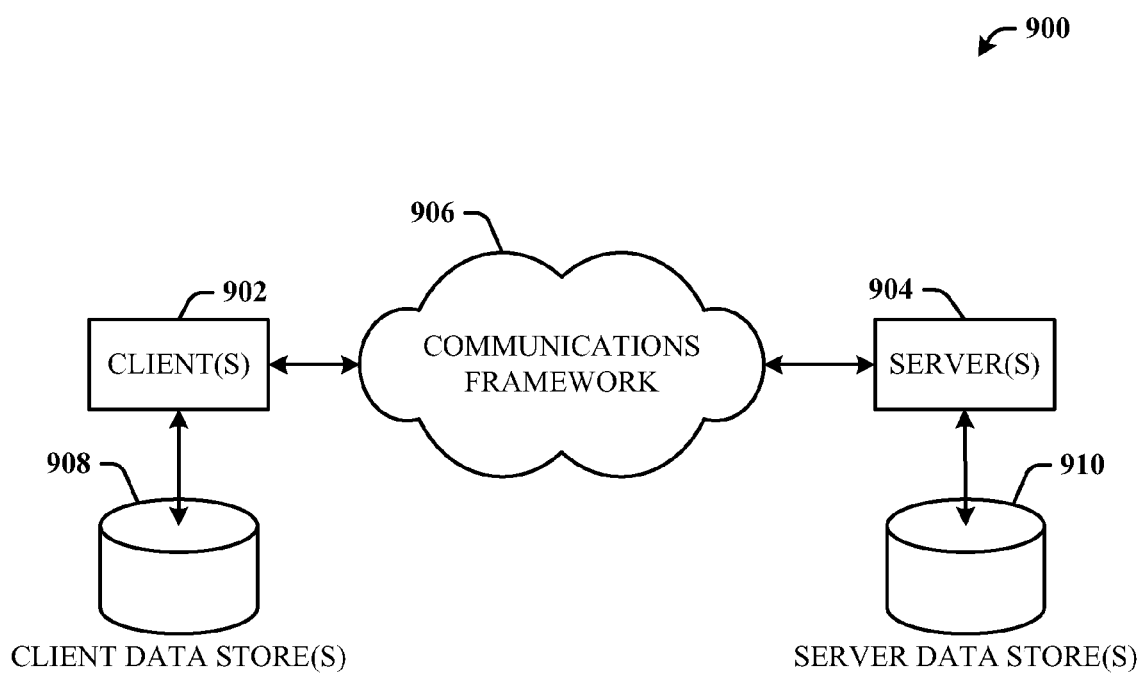
FIG. 9 illustrates a schematic block diagram of a computing environment that utilizes auto-detection of historical search context.

Referring now to FIG. 9, there is illustrated a schematic block diagram of a computing environment 900 that utilizes auto-detection of historical search context. The environment 900 includes one or more client(s) 902. The client(s) 902 can be hardware and/or software (e.g., threads, processes, computing devices). The client(s) 902 can house cookie(s) and/or associated contextual information, for example.

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A volatile memory, non-volatile memory, optical disk, or hard drive storing computer-executable instructions which, when executed by a computer, cause the computer to perform acts comprising:
representing historical user behaviors of a user using a set of features, the set of features including click features and query features;
training a classifier using training data comprising values for the features to identify a plurality of historical search contexts, wherein the plurality of historical search contexts include:
a first historical search context having first values for the features, wherein the first values include:
first click feature values for the click features, the first click feature values representing multiple first clicks entered by the user on multiple different first uniform resource locators (URLs) as part of the first historical search context, and
first query feature values for the query features, the first query feature values representing multiple different first queries entered by the user as part of the first historical search context,
a second historical search context having second values for the features, wherein the second values include:
second click feature values for the click features, the second click feature values representing multiple second clicks entered by the user on multiple different second URLs as part of the second historical search context, and
second query feature values for the query features, the second query feature values representing multiple different second queries entered by the user as part of the second historical search context;
representing current user behavior during a current user session using third values for the features, wherein the third values include current click feature values for the click features and current query feature values for the query features, the current click feature values representing multiple current clicks entered by the user on multiple different current URLs during a current session and the current query feature values representing multiple different current queries entered by the user during the current session;
during the current user session, determining that the current user behavior is relatively more similar to the first historical search context than the second historical search context, wherein the determining comprises:
using the first click feature values, the second click feature values, and the current click feature values to analyze similarity of the multiple different current URLs clicked by the user during the current session to the multiple different first URLs clicked by the user as part of the first historical search context and the multiple different second URLs clicked by the user as part of the second historical search context, and
using the first query feature values, the second query feature values, and the current query feature values to analyze similarity of the multiple current queries entered by the user during the current session to the multiple different first queries entered by the user as part of the first historical search context and the multiple different second queries entered by the user as part of the second historical search context; and surfacing the first historical search context as part of the current session for the user.

2. A method performed by at least one computing device, the method comprising:
receiving a current search query from a user during a current user session having associated current user behavior;
analyzing a search history for one or more historical search contexts by applying similarity analysis to the current search query and historical queries in the search history;
detecting an individual historical search context to use as a current search context by relating tagged historical user behaviors associated with the individual historical search context to the current user behavior that is associated with the current user session;
presenting the current search context for user interaction, including presenting individual historical queries from the detected individual historical search context; and
responsive to the user hovering over a first one of the individual historical queries for the detected individual historical search context, presenting individual URLs that were historically clicked on for the first individual historical query that is being hovered over.

3. The method according to claim 2, further comprising providing feedback for tuning the detecting based on the hovering, the tuning being performed by training a classifier used for the detecting.

4. The physical storage media of claim 1, the acts further comprising:
creating a click graph representing the multiple first clicks and the multiple second clicks, the click graph having a first terminal state representing a first web page labeled as a first category and a second terminal state representing a second web page labeled as a second category;
performing a first random walk over the click graph for an individual first click to reach the first terminal state;
responsive to reaching the first terminal state via the first random walk, tagging the individual first click with the first category as an individual first click feature value;
performing a second random walk over the click graph for an individual second click to reach the second terminal state;
responsive to reaching the second terminal state via the second random walk, tagging the individual second click with the second category as an individual second click feature value.

5. The physical storage media of claim 1, the acts further comprising:
creating a click graph representing the multiple first clicks and the multiple second clicks, the click graph having a first terminal state representing a first web page labeled as a first category and a second terminal state representing a second web page labeled as a second category;
performing a first random walk over the click graph for an individual first query to reach the first terminal state;
responsive to reaching the first terminal state via the first random walk, tagging the individual first query with the first category as an individual first query feature value;
performing a second random walk over the click graph for an individual second query to reach the second terminal state; and
responsive to reaching the second terminal state via the second random walk, tagging the individual second query with the second category as an individual second query feature value.

6. The physical storage media of claim 1, the acts further comprising:
   determining that an individual first URL is the most-frequently clicked URL for an individual first query entered by the user as part of the first historical search context; and
   tagging the individual first query with the individual first URL as an individual first query feature value;
   determining that an individual second URL is the most-frequently clicked URL for an individual second query entered by the user as part of the second historical search context; and
   tagging the individual second query with the individual second URL as an individual second query feature value.

7. The physical storage media of claim 1, the acts further comprising:
   determining that an individual first domain is the most-frequently clicked domain for an individual first query entered by the user as part of the first historical search context;
   tagging the individual first query with the individual first domain as an individual first query feature value;
   determining that an individual second domain is the most-frequently clicked domain for an individual second query entered by the user as part of the second historical search context; and
   tagging the individual second query with the individual second domain as an individual second query feature value.

8. The physical storage media of claim 1, wherein the determining comprises:
   determining a first Levenshtein distance between an individual current query entered by the user during the current session and an individual first query entered by the user as part of the first historical search context; and
   determining a second Levenshtein distance between the individual current query entered by the user during the current session and an individual second query entered by the user as part of the second historical search context.

9. The physical storage media of claim 1, the acts further comprising:
   highlighting at least one word in an individual first query entered by the user as part of the first historical search context that is not present in an individual current query entered by the user during the current session.

10. The physical storage media of claim 1, the acts further comprising:
    updating the training of the classifier based on at least one subsequent click entered by the user after surfacing the first historical search context during the current user session.

11. The physical storage media of claim 1, wherein the surfacing comprises displaying, during the current user session, the multiple first queries entered by the user as part of the first historical search context.

12. The physical storage media of claim 11, wherein the surfacing comprises displaying, during the current user session:
    an individual first URL that was returned in response to an individual first query and clicked on by the user as part of the first historical search context, and
    another individual first URL that was returned in response to another individual first query and clicked on by the user as part of the first historical search context.

13. A system comprising:
    at least one processing unit; and
    one or more physical storage media storing computer-executable instructions which, when executed by the at least one processing unit, cause the at least one processing unit to:
      represent historical user behaviors of a user using a set of features, the set of features including click features and query features;
      train a classifier using training data comprising values for the features to identify a plurality of historical search contexts, wherein the plurality of historical search contexts include:
        a first historical search context having first values for the features, wherein the first values include:
          first click feature values for the click features, the first click feature values representing multiple first uniform resource locators (URLs) clicked on by the user as part of the first historical search context, and
          first query feature values for the query features, the first query feature values representing multiple first queries entered by the user as part of the first historical search context,
        a second historical search context having second values for the features, wherein the second values include:
          second click feature values for the click features, the second click feature values representing multiple second URLs clicked on by the user as part of the second historical search context, and
          second query feature values for the query features, the second query feature values representing multiple second queries entered by the user as part of the second historical search context;
      represent current user behavior during a current user session using third values for the features, wherein the third values include current click feature values for the click features and current query feature values for the query features, the current click feature values representing multiple current URLs clicked on by the user during a current session and the current query feature values representing multiple current queries entered by the user during the current session;
      during the current user session, determine that the current user behavior is relatively more similar to the first historical search context than the second historical search context, wherein the determining comprises analyzing similarity of:
        the current click feature values to the first click feature values and the second click feature values, and
        the current query feature values to the first query feature values and the second query feature values; and
      surface the first historical search context as part of the current session for the user.

14. The system of claim 13, wherein the computer-executable instructions further cause the processing unit to:
    tag an individual first query entered by the user as part of the first historical search context based on a first vertical search engine to which the individual first query was submitted by the user as part of the first historical search context; and
    tag an individual second query entered by the user as part of the second historical search context based on a second vertical search engine to which the individual second query was submitted by the user as part of the second historical search context.

15. The system of claim 14, wherein the computer-executable instructions further cause the processing unit to:
tag an individual current query entered by the user during the current user session based on a third vertical search engine to which the individual current query was submitted by the user.

16. The system of claim 13, wherein the computer-executable instructions further cause the processing unit to:
tag an individual first query entered by the user as part of the first historical search context with a first time of day when the individual first query was submitted; and
tag an individual second query entered by the user as part of the second historical search context with a second time of day when the individual second query was submitted,
wherein the first time of day is morning and the second time of day is evening.

17. The system of claim 13, wherein the computer-executable instructions further cause the processing unit to:
tag an individual first query entered by the user as part of the first historical search context with a first location from which the individual first query was submitted; and
tag an individual second query entered by the user as part of the second historical search context with a second location from which the individual second query was submitted,
wherein the second location is different than the first location.

18. The system of claim 13, wherein the computer-executable instructions further cause the processing unit to:
tag an individual first query entered by the user as part of the first historical search context with a first device from which the individual first query was submitted; and
tag an individual second query entered by the user as part of the second historical search context with a second device from which the individual second query was submitted,
wherein the first device and the second device are different devices.

19. The system of claim 13, wherein the computer-executable instructions further cause the processing unit to:
tag an individual first query entered by the user as part of the first historical search context with a first seasonal time when the individual first query was submitted; and
tag an individual second query entered by the user as part of the second historical search context with a second seasonal time when the individual second query was submitted,
wherein the first seasonal time and the second seasonal time occur in different weeks.

20. The system of claim 13, wherein the computer-executable instructions further cause the processing unit to:
iteratively train the classifier to recognize additional historical search contexts based on subsequent training data obtained as the user enters subsequent clicks during subsequent user sessions.

* * * * *